United States Patent [19]
Baker

[11] Patent Number: 5,346,178
[45] Date of Patent: Sep. 13, 1994

[54] PRESSURE EQUALIZED FLOW CONTROL VALVE

[75] Inventor: William J. Baker, Valley Center, Calif.

[73] Assignee: National-Oilwell, Houston, Tex.

[21] Appl. No.: 127,983

[22] Filed: Sep. 28, 1993

[51] Int. Cl.⁵ .............................................. F16K 5/06
[52] U.S. Cl. .............................. 251/315 SE; 137/860
[58] Field of Search ............. 251/314, 315 R, 315 SE, 251/317; 137/860

[56] References Cited

U.S. PATENT DOCUMENTS

| | | | |
|---|---|---|---|
| 3,122,352 | 2/1964 | Anderson et al. | 137/860 X |
| 3,228,652 | 1/1966 | Antrim | 251/315 SE X |
| 3,778,029 | 12/1973 | Baker | 251/315 |
| 4,236,691 | 12/1980 | Wright | 251/315 |
| 4,254,793 | 3/1981 | Scaramucci | 251/315 SE X |
| 4,385,747 | 5/1983 | Renaud, Jr. et al. | 251/315 |
| 4,557,461 | 12/1985 | Gomi et al. | 251/172 |
| 4,796,858 | 1/1989 | Kabel | 137/860 X |

*Primary Examiner*—John C. Fox
*Attorney, Agent, or Firm*—R. J. Bunyard; L. A. Fillnow; R. H. Johnson

[57] ABSTRACT

A flow control valve such as a ball valve (12) for controlling fluid flow through a flow line (16). The control valve includes a flow chamber (18), an upstream passage (19), a downstream passage (20), a cylindrical body (24), a retainer (26) sealingly engaging the outer annular surface of the flow line and secured to the valve body by a pair of flanges (28), a flow control ball (32) rotatably disposed within the flow chamber for controlling fluid flow through the passages, an operating member (42) for rotating the ball between open and closed positions and means (70) for equalizing the pressure in the valve chamber. The ball includes a centrally bored flow passageway (36) for communicating fluid through the passages and is rotatably supported within the chamber by an annular upstream seat carrier (48) and an annular downstream seat carrier (50). Each seat carrier includes a ball seat (52) positioned within an annular recess (54) provided on the inwardly facing surface (55) of the seat carrier and an O-ring (56) positioned within an annular recess (58) provided on an axially facing surface (59) of the seat carrier. Each seat 52 includes an inwardly facing surface (60) that abuts the outer surface of the ball and an axially facing surface (62) that abuts an axial surface (64) of the seat recess. The pressure equalizing means includes a passage (72) extending radially inwardly within seat carrier (48) and communicates with an annular groove (73) cut in axial recess (58) and with chamber (18) by an outlet (76) in a recessed portion (82) on an outwardly facing surface (80) of seat carrier (48). Pressure is equalized when upstream pressure is introduced into chamber (18) inside O-ring (56), through groove (73) and through passage (72). The O-ring in seat carrier (50) seals against ball (32).

11 Claims, 7 Drawing Sheets

5,346,178

PRESSURE EQUALIZED FLOW CONTROL VALVE

BACKGROUND OF THE INVENTION

This invention relates to a high pressure flow control valve. More particularly, the invention relates to an improved sealing system for pressure equalization of the valve chamber.

Ball valves include a central bore for controlling passage of fluid through a flow line with a ball being disposed within a valve chamber and rotationally supported by a pair of spaced annular seat carriers. Each of the seat carriers encircles a valve seat with the seats sealing the upstream flow passage from the downstream flow passage. A common problem is that the upstream seat tends to become extruded from the seat carrier or blown out of the valve chamber if the valve is opened when a large differential pressure exists, i.e., high upstream pressure and low downstream pressure. To solve this problem, the prior art has suggested means for pressure equalization between the upstream flow passage and the valve chamber. For example, it is known to provide slots on the outside diameter of the seats. When pressure differential causes the upstream seat to move against the ball with the ball moving downstream a short distance, pressure in the valve chamber is equalized through the slots. As soon as the pressure differential in the valve chamber is eliminated, the upstream seat returns to its original position.

U.S. Pat. No. 3,778,029, incorporated herein by reference, discloses a two-way ball valve including a sealing system that seals on the downstream seat while equalizing pressure on the upstream seat. The valve includes a pair of spaced seats disposed on each side of a flow control ball. Each seat is encircled by a seat carrier with the upstream seat carrier intentionally leaking in the downstream direction and the downstream seat providing a seal between the valve chamber and the downstream flow passage. That is, only the downstream seat actively seals the flow line. When it is desired to equalize upstream pressure into the valve chamber, a U-shaped seal is provided on both seat carriers. This U-shaped seal is positioned within an annular recess in an outwardly facing corner of the seat carriers adjacent the inner wall of the valve chamber. This sealing system seals the downstream side of the flow control ball, equalizes pressure between the valve chamber and the upstream seat and reduces the turning torque required to open the valve. A disadvantage of this pressure equalization system, however, is an excessive cost for the U-shaped seal ring, which must be specially constructed for this application.

Another disadvantage of prior art ball valves is they generally can be used only in low pressure situations, i.e., less than 3000 psi, because the elastomeric valve seats deform excessively under high compressive loads with high differential pressures. Ball valves for use in high pressure situations, i.e., 3000–10000 psi, generally use trunnion mounted control balls. A ball valve having a trunnion mounted flow control ball has reduced operating torque but is more costly to manufacture and does not seal as well as a valve having a floating control ball.

Accordingly, there remains a need for a flow control valve that can be used in high pressure applications having an inexpensive sealing system that seals on the downstream seat only and equalizes upstream pressure into the valve chamber.

BRIEF SUMMARY OF THE INVENTION

A principal object of the invention is to provide a flow control valve having a sealing system that equalizes upstream pressure into the valve chamber when operated in a high pressure environment.

Another object of the invention is to provide a flow control valve having a sealing system that seals on the downstream seat only.

Additional objects include preventing blowouts of the upstream valve seat and reducing the turning torque required to open the control valve.

The invention relates to an improved sealing system for pressure equalization in a flow control valve. The control valve includes a valve body having upstream and downstream flow passages, a generally cylindrical valve chamber communicating with the flow passages, means for controlling fluid flow through the passages, means for operating the fluid control means between open and closed positions and means for equalizing differential pressure in the valve chamber. The flow control means includes a central passageway for communicating fluid between the passages and is positioned between a pair of spaced annular seat carriers in the valve chamber. Each seat carrier is disposed in an encircling relationship around a valve seat and includes an annular recess on an inwardly facing surface and an annular recess on an axially facing surface. The valve seat is positioned within the inward recess and a seal is positioned within the axial recess. The pressure equalization means includes a fluid passage within the upstream seat carrier for communicating the axial recess to the valve chamber.

Another feature of the invention is for the aforesaid pressure equalization means to include an annular groove in the axial recess and an outlet on the outwardly facing surface of the upstream seat carrier.

Another feature of the invention is for the aforesaid pressure equalization means to include a plurality of fluid passages.

Another feature of the invention is for the aforesaid seal being an O-ring.

Another feature of the invention is for the aforesaid passage outlets being evenly spaced from one another.

Another feature of the invention is for the aforesaid flow control means being a ball rotatably supported by the seat carriers.

Advantages of the invention include a pressure equalizing control valve that is less costly to manufacture, can be used in high pressure applications without blowing out the upstream valve seat, has reduced turning torque required to open the valve and has superior shut-off capability.

The above and other objects, features and advantages of the invention will become apparent upon consideration of the detailed description and appended drawings.

DETAILED DESCRIPTION OF THE PREFERRED EMBODIMENT

Figure 1:
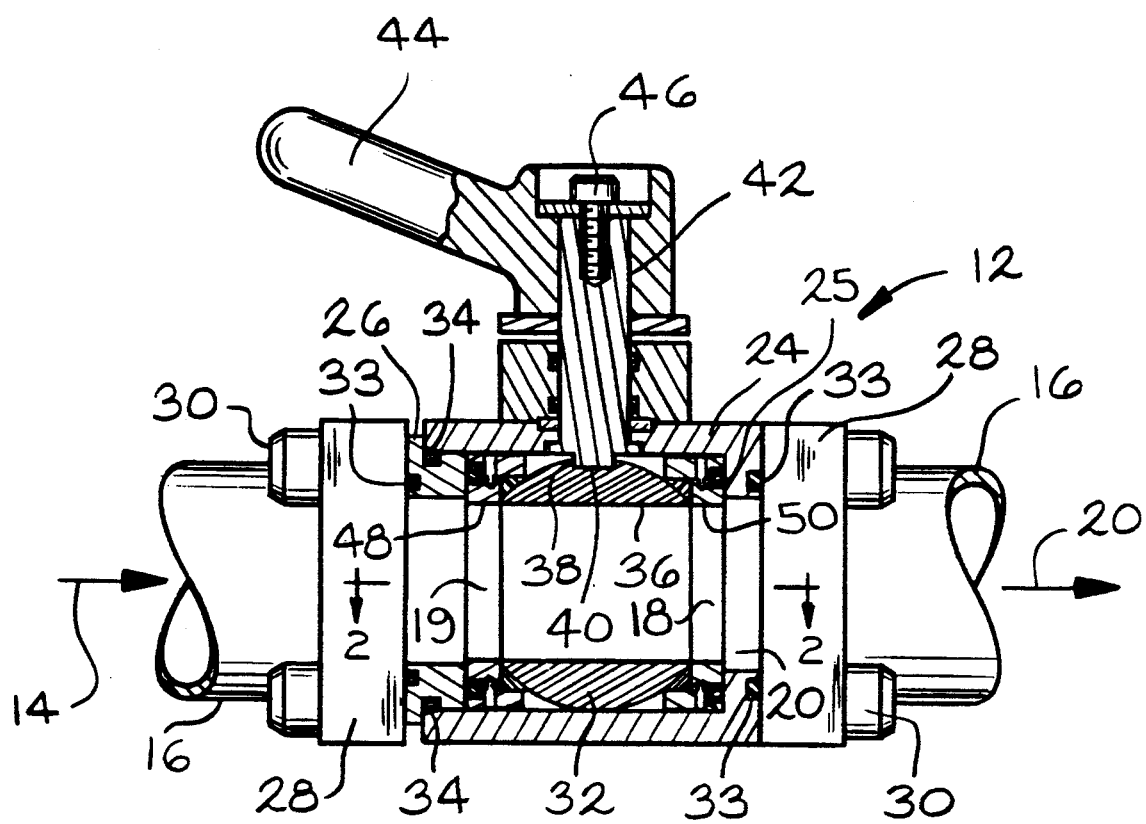
FIG. 1 is an elevation view, partially in longitudinal section, of a flow control valve of the invention incorporating means for equalizing valve chamber pressure.

Referring to FIG. 1, reference numeral 12 denotes a flow control valve of the invention for controlling fluid flow through a flow line. Although not so limited, the flow control valve of the invention is particularly suited for ball valves such as manifolds for oil field purposes. Flow control valve 12 controls upstream fluid 14 in a flow line 16 through a chamber 18 communicating with an upstream passage 19 and a downstream passage 20. Flow control valve 12 illustrated is a two-way valve including a valve body 24, a shoulder 25, a retainer 26 sealingly engaging the outer annular surface of flow line 16, means for controlling fluid flow through the passages such as a ball 32 rotatably disposed within chamber 18, means for operating the ball between open and closed positions and means for equalizing the pressure between the upstream passage and the valve chamber. The retainer and valve body are secured by suitable means such as spaced flanges 28. Flanges 28 are sealed with the outer surface of flow line 16 by O-rings 33 and retainer 26 is sealed with the inner surface of valve body 24 by an O-ring 34. The flanges are secured to the valve body by threaded bolts 30. Ball 32 includes a centrally bored flow passageway 36 for communicating fluid 14 through the passages. The ball operating means includes a rectangular slot 38 provided in the outer surface of the ball with slot 38 being sized to receive a rectangular end 40 of an operating member 42. An operating handle 44 is secured to operating member 42 by a screw 46. Ball 32 is shifted between open and closed positions by rotating operating handle 44 with the open position being illustrated in FIG. 1.

Figure 2:
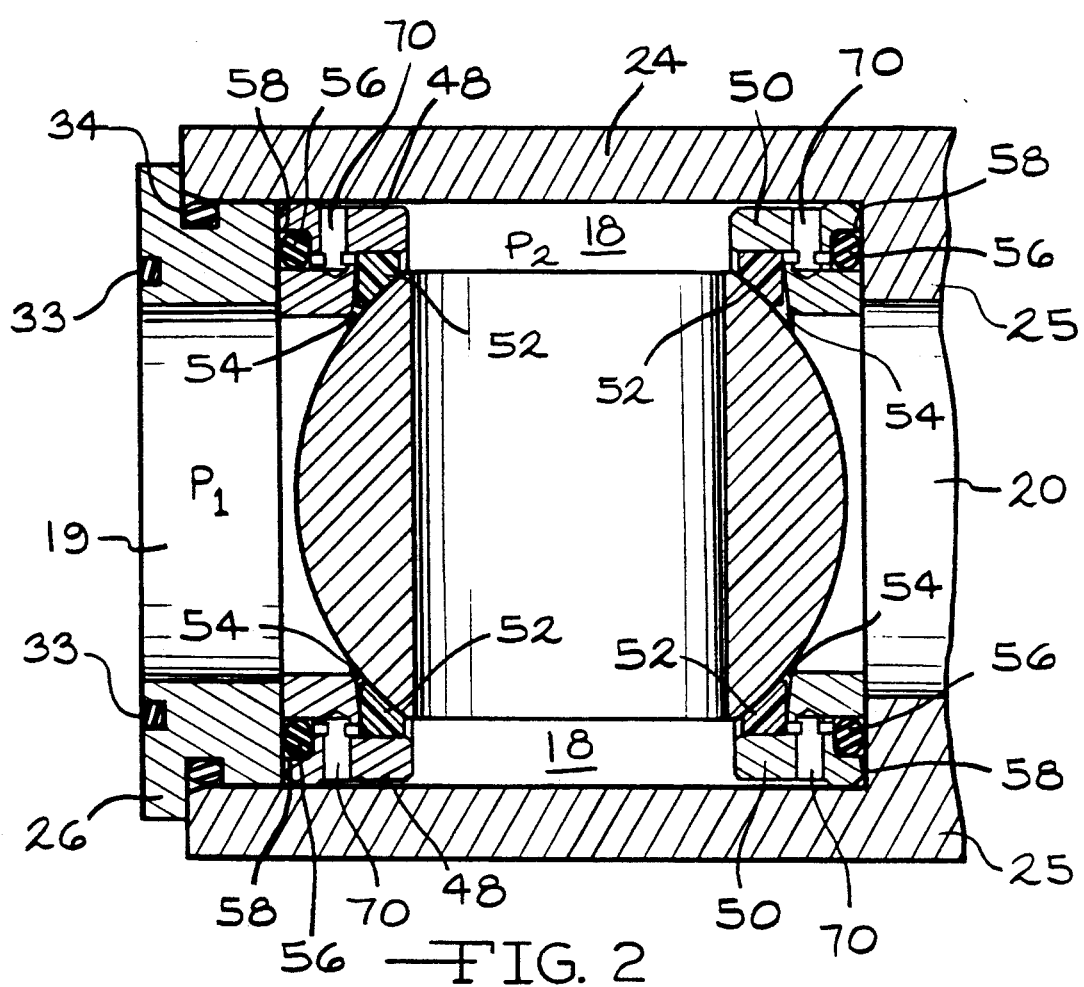
FIG. 2 is an enlarged longitudinal section view of the valve body of the flow control valve taken along line 2—2 of FIG. 1.

FIG. 2 illustrates an enlarged view of the improved sealing system for pressure equalization of the valve chamber of the invention of FIG. 1 with parts of the control valve removed for clarity. Unlike FIG. 1, ball 32 in FIG. 2 is shown in a closed position. The ball is rotatably supported in chamber 18 within flow line 16 by an upstream annular seat carrier 48 and a downstream annular seat carrier 50. With the ball in the closed position, it would appear that a high pressure differential could exist between upstream side 19 of the flow line and valve chamber 18. That is, upstream pressure $P_1$ could be substantially greater than downstream pressure $P_2$ in chamber 18. As it will become apparent from the following description, upstream pressure $P_1$ is introduced into chamber 18 through means located in upstream seat carrier 48 so that the two pressures become equalized, i.e., pressures $P_1$ and $P_2$ become substantially the same.

Figure 3:
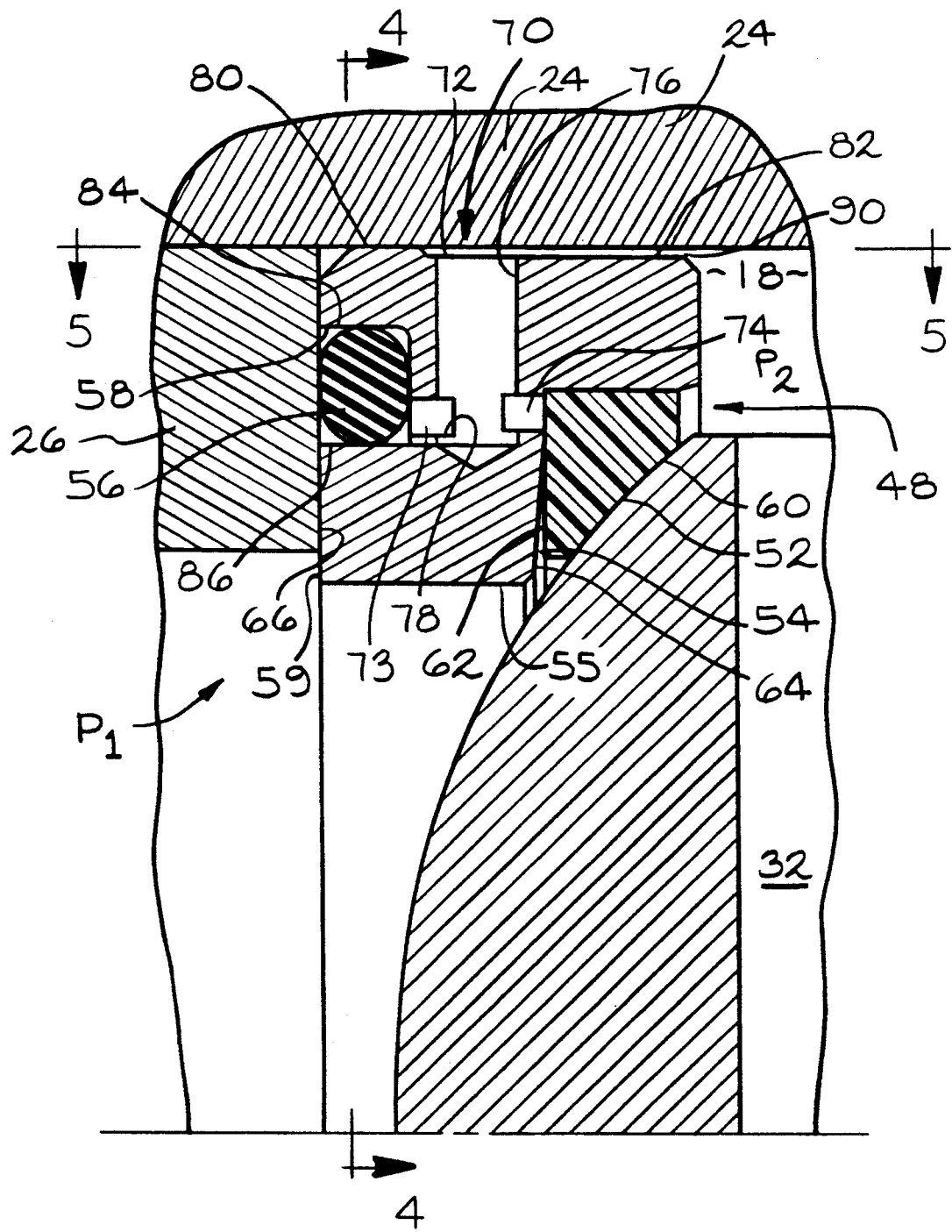
FIG. 3 is an enlarged view illustrating details of the upstream seat carrier of FIG. 2.

The improved sealing arrangement of the invention now will be described in reference to upstream seat carrier 48 illustrated in detail in FIG. 3. Preferably, each seat carrier is identical so as to minimize the number of required parts during manufacture and to eliminate concern about valve orientation during installation within a flow line. Seat carrier 48 includes a valve seat 52, a seal 56 and means 70 for equalizing the pressure between upstream passage 19 and chamber 18. Seat 52 is received within an inwardly facing annular recess 54 positioned on the inner surface 55 of seat carrier 48. Seal 56 preferably is an O-ring received within an axially facing annular recess 58 positioned on an outer surface 59 of seat carrier 48. Other sealing ring configurations such as an L-shaped ring could be used as well. Each seat carrier is disposed in an encircling relationship around the valve seat with the outer surface of the seat carrier being contiguous with the inside wall of valve body 24. The valve seats may be constructed from any relatively hard, resilient synthetic resin material such as nylon, Teflon or Delrin. Seat 52 includes an inwardly facing arcuate surface 60 that abutts the surface of ball 32 and an axially facing surface 62 that abuts an axially facing surface 64 of recess 54. The radius of curvature of surface 60 preferably is smaller than the radius of curvature of ball 32 to facilitate interference loading of the valve seats when assembled. Recess 58 includes an outer support shoulder 84 and an inner support shoulder 86. O-ring 56 is snugly supported by shoulders 84 and 86 and an inwardly facing surface 66 of retainer 26.

Pressure equalization means 70 preferably includes a drilled passage 72 extending radially inwardly from a recessed portion 82 provided on an outwardly facing surface 80 of seat carrier 48. Passage 72 communicates upstream pressure from an inlet in axial recess 58 to valve chamber 18. The inlet in axial recess 58 preferably is an annular groove 73. The pressure equalization path passes through groove 73, passage 72 and a narrow passageway 90 to chamber 18. Passageway 90 is formed by the reduced diameter of recessed portion 82 of surface 80 and is defined by recess 82 and the inner surface of valve body 24. Pressure equalization means 70 may include another annular groove 74 cut in inward recess 54 which also communicates with passage 72 for venting pressure during the instant when the ball valve is being opened. Groove 74 is desirable in those situations where high differential pressure occurs at the instant of opening the control valve. During service, O-ring 56 in upstream seat carrier 48 does not seal but allows pressure $P_1$ to pass to valve chamber 18. Pressure $P_1$ continues through means 70 until pressure $P_2$ in valve chamber 18 becomes substantially equal to upstream pressure $P_1$. O-ring 56 in downstream seat carrier 50 (FIG. 2) seals the flow line.

While the pressure equalization means just described is particularly suited for ball valves, it will be understood the pressure equalization means of the invention could be used with other flow control valves such as a gate valve. For example, the rotatable flow control ball of a ball valve could be replaced with a vertically sliding flow control gate of a gate valve. The sliding gate would be disposed between a pair of annular seat carriers with the upstream valve seat abutting the upstream side of the gate and the downstream valve seat abutting the downstream side of the gate.

Figure 4:
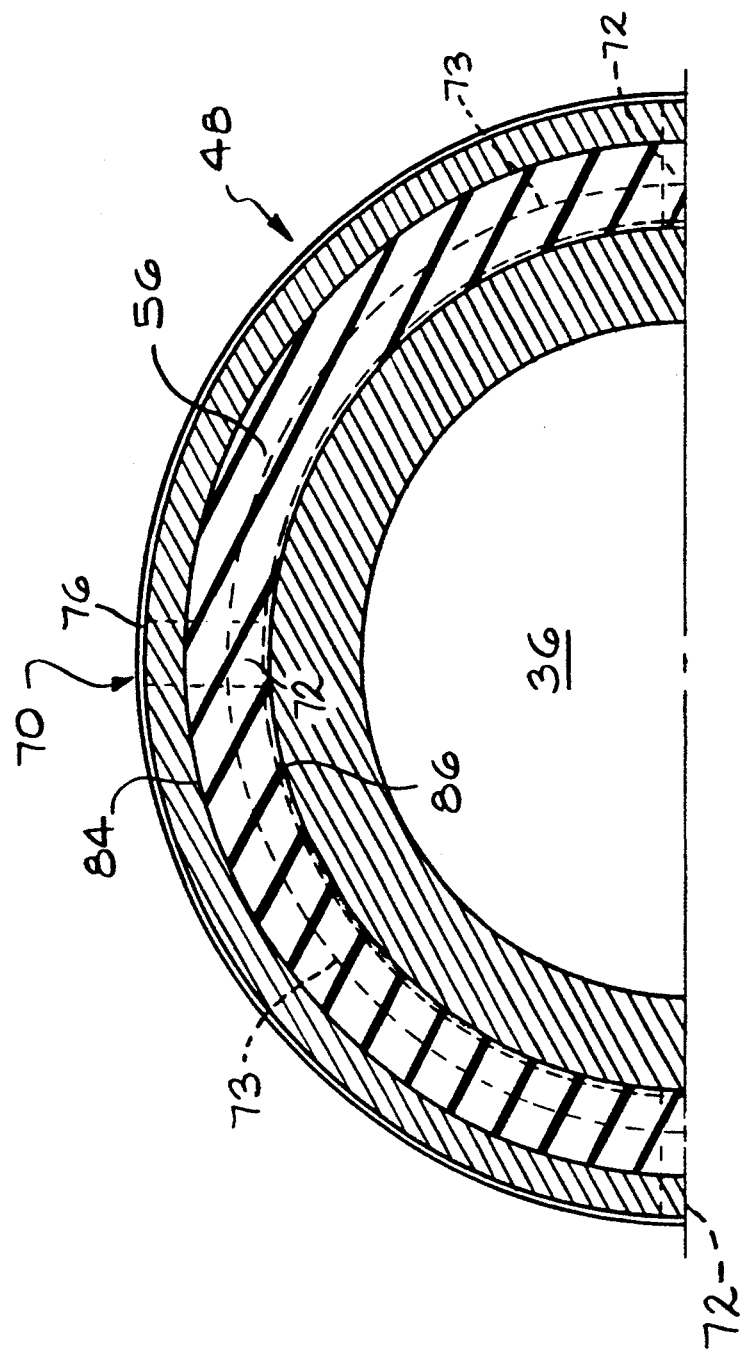
FIG. 4 is a cross section view of the seat carrier and sealing ring taken along line 4—4 of FIG. 3.
Figure 5:
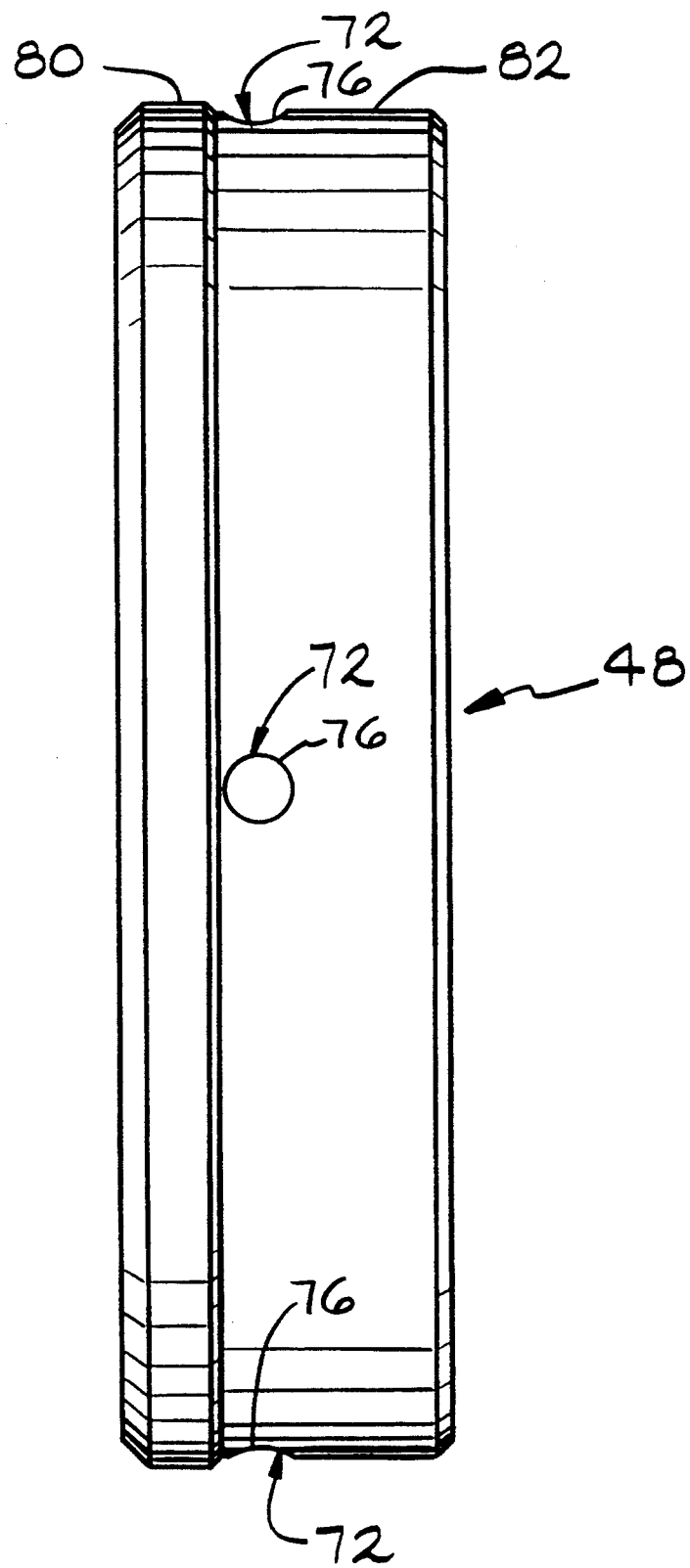
FIG. 5 is a plan view of the seat carrier taken along line 5—5 of FIG. 3.

The pressure equalization means may include evenly spaced multiple passages. FIGS. 4 and 5 illustrate a preferred embodiment of pressure equalization means 70 including four passages 72. Each passage has an outlet 76 with the outlets being evenly spaced from one another in recessed portion 82 of surface 80 of seat carrier 48.

Figure 6:
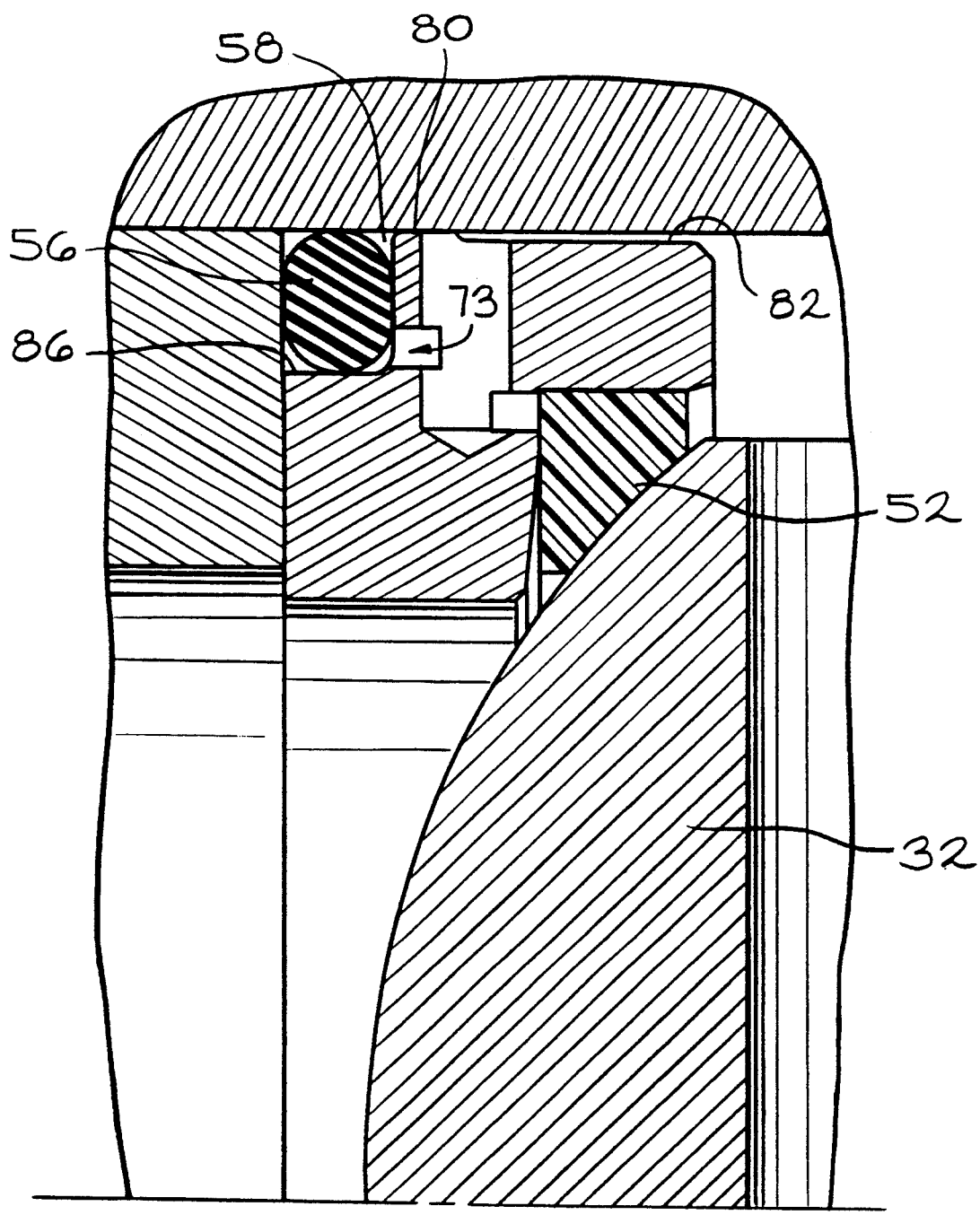
FIG. 6 is a view similar to FIG. 3 illustrating another embodiment of a seat carrier of the invention.

FIG. 6 illustrates another embodiment of axial recess 58. In this embodiment, recess 58 does not utilize an outer shoulder for providing radial support for sealing ring 56. Rather, radial support is provided by the inner surface of valve body 24.

Figure 7:
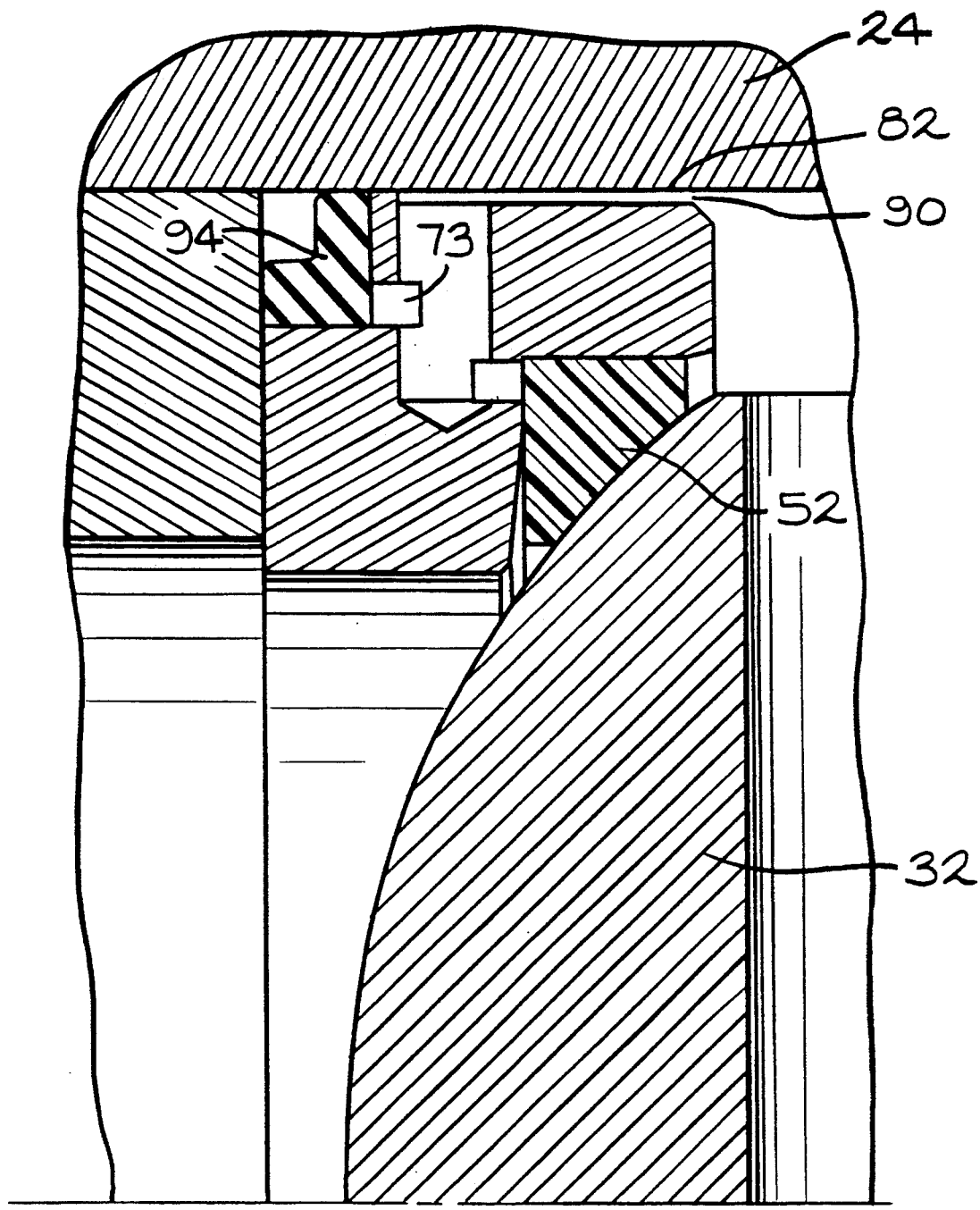
FIG. 7 illustrates another embodiment of the invention similar to that illustrated in FIG. 6 with the sealing ring being an L-shape.

FIG. 7 illustrates another embodiment of the invention with the seat carrier being similar to FIG. 6. The O-ring is replaced with an L-shaped sealing ring 94.

The improved sealing system for pressure equalization now will be explained by referring to FIG. 3. In the event that upstream flow line pressure $P_1$ exceeds pressure $P_2$ in chamber 18 when the control valve is in the closed position, the path of pressure equalization occurs as follows. The path travels along the inside of O-ring 56 in upstream seat carrier 48 along the outer surface of shoulder 86, into groove 73, through passage 72 to outlet 76 and then through passageway 90 into chamber 18. Pressure $P_1$ tends to lift O-ring 56 away from the outer surface of inner shoulder 86 when passing toward groove 73. Pressure $P_1$ continues through means 70 until pressure $P_2$ in chamber 18 becomes substantially equal to upstream pressure $P_1$. With downstream seat carrier 50 having identical dimensions as upstream seat carrier 48, pressure equalization occurs because seat carrier 50 (FIG. 2) simultaneously is sealed off from downstream passageway 20 of flow line 16. By equalizing the pressure in the valve chamber to the upstream pressure, minimal force exists between seat 52 and ball 32 in seat carrier 48. This also reduces the torque by about half that otherwise would be necessary to operate member 42 when opening the control valve. Thus, O-rings 56 of two-way valve 12 act as a one-way sealing system only sealing the downstream side of the flow control ball while allowing pressure equalization between the upstream side of the flow control ball and the valve chamber.

It will be understood various modifications may be made to the invention without departing from the spirit and scope of it. Therefore, the limits of the invention should be determined from the appended claims.

What is claimed is:

1. A valve for controlling passage of fluid through a flow line, comprising:

a valve body having upstream and downstream flow passages, a generally cylindrical valve chamber communicating with the flow passages, means for controlling fluid flow through the passages, means for operating the fluid control means between open and closed positions and means for equalizing differential pressure in the valve chamber, the flow control means including a central passageway for communicating fluid between the passages and positioned between a pair of spaced annular seat carriers in the valve chamber, each seat carrier being disposed in an encircling relationship around a valve seat and including an annular recess on an inwardly facing surface and an annular recess on an axially facing surface, the recess on the axially facing surface including an inlet, the valve seat positioned within the recess on the inwardly facing surface and a seal positioned within the recess on the axially facing surface, the pressure equalization means including a fluid passage extending radially within the upstream seat carrier, whereby the pressure equalization passage is for communicating upstream pressure from the inlet of the recess on the axially facing surface through the upstream seat carrier to the valve chamber.

2. The control valve of claim 1 wherein the seal is an O-ring.

3. The control valve of claim 2 wherein the recess on the axially facing surface includes an outer support shoulder.

4. The control valve of claim 1 wherein the pressure equalization means includes multiple passages.

5. The control valve of claim 4 wherein the pressure equalization passages are evenly spaced from one another.

6. The control valve of claim 5 wherein an outwardly facing surface of the seat carrier includes a recessed portion with outlets of each of the pressure equalization passages being positioned within the recessed portion.

7. The control valve of claim 1 wherein the recess on the axially facing surface includes an annular groove.

8. The control valve of claim 7 wherein the pressure equalization passage includes a second groove communicating with the recess on the inwardly facing surface.

9. The control valve of claim 1 wherein the flow control means is a ball rotatably supported by the seat carriers.

10. A valve for controlling passage of fluid through a flow line, comprising:

a valve body having upstream and downstream flow passages, a generally cylindrical valve chamber communicating with the flow passages, a ball for controlling fluid flow through the passages, means for operating the ball between open and closed positions and means for equalizing differential pressure in the valve chamber, the ball including a central passageway for communicating fluid between the passages and rotatably supported between a pair of spaced annular seat carriers in the valve chamber, each seat carrier being disposed in an encircling relationship around a valve seat and including an annular recess on an inwardly facing surface and an annular recess on an axially facing surface, the recess on the axially facing surface including an annular groove, the valve seat positioned within the recess on the inwardly facing surface and an O-ring seal positioned within the recess on the axially facing surface, the pressure equalization means including a fluid passage extending radially within the upstream seat carrier, whereby the pressure equalization passage is for communicating upstream pressure from an inlet in the annular groove in the recess on the axially facing surface to an outlet on an outwardly facing surface of the upstream seat carrier.

11. A valve for controlling passage of fluid through a flow line, comprising:

a valve body having upstream and downstream flow passages, a generally cylindrical valve chamber communicating with the flow passages, a ball for controlling fluid flow through the passages, means for operating the ball between open and closed positions and means for equalizing differential pressure in the valve chamber, the ball including a central passageway for communicating fluid between the passages and rotatably supported between a pair of spaced annular seat carriers in the valve chamber, each seat carrier being disposed in an encircling relationship around a valve seat and including an annular recess on an inwardly facing surface and an annular recess on an axially facing surface, the recess on the axially facing surface including an annular groove, the valve seat positioned within the recess on the inwardly facing surface and an O-ring seal positioned within the recess on the axially facing surface, the pressure equalization means including a plurality of fluid passages extending radially within the upstream seat carriers;

each pressure equalization passage extending from an inlet in the annular groove in the recess on the axially facing surface to an outlet on an outwardly facing surface of the seat carrier, whereby the pressure equalization passages of the upstream seat carrier are for communicating upstream pressure from the inlets in the recess on the axially facing surface to the outlets on the outwardly facing surface of the upstream seat carrier.

* * * * *